United States Patent
Maher et al.

(10) Patent No.: US 9,942,947 B2
(45) Date of Patent: Apr. 10, 2018

(54) HEATER AND METHOD FOR MANUFACTURING A HEATER

(71) Applicant: BorgWarner Ludwigsburg GmbH, Ludwigsburg (DE)

(72) Inventors: Anthony Maher, Limerick (IE); Katherine O'Sullivan, Farranfore (IE); Steven Sweeney, Farranfore (IE); William O'Connor, Killarney (IE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 155 days.

(21) Appl. No.: 14/699,069

(22) Filed: Apr. 29, 2015

(65) Prior Publication Data

US 2015/0319807 A1 Nov. 5, 2015

(30) Foreign Application Priority Data

May 2, 2014 (DE) .................. 10 2014 106 157
Jul. 18, 2014 (DE) .................. 10 2014 110 164

(51) Int. Cl.
| | |
|---|---|
| H05B 3/44 | (2006.01) |
| H01C 17/065 | (2006.01) |
| B60H 1/22 | (2006.01) |
| F24H 3/04 | (2006.01) |
| H05B 3/46 | (2006.01) |
| H05B 3/26 | (2006.01) |

(52) U.S. Cl.
CPC ............ *H05B 3/44* (2013.01); *B60H 1/2225* (2013.01); *F24H 3/0429* (2013.01); *H01C 17/065* (2013.01); *H05B 3/262* (2013.01); *H05B 3/46* (2013.01); *H05B 2203/013* (2013.01); *H05B 2203/02* (2013.01); *H05B 2203/023* (2013.01); *Y10T 29/49085* (2015.01)

(58) Field of Classification Search
CPC ... B60H 1/2225; F24H 3/0429; H01C 17/065; H05B 2203/013; H05B 2203/02; H05B 2203/023; H05B 3/262; H05B 3/44; H05B 3/46; Y10T 29/49085
USPC ............... 219/534, 539, 548, 553, 504, 505; 29/611; 338/22 R
See application file for complete search history.

(56) References Cited

U.S. PATENT DOCUMENTS

| | | | | |
|---|---|---|---|---|
| 4,032,752 A | * | 6/1977 | Ohmura | F01N 3/2013 219/541 |
| 4,327,282 A | * | 4/1982 | Nauerth | H05B 3/10 219/505 |
| 4,343,988 A | * | 8/1982 | Roller | A47J 31/545 165/165 |
| 4,716,279 A | | 12/1987 | Hori et al. | |
| 5,471,034 A | * | 11/1995 | Kawate | B60H 1/2225 219/483 |

(Continued)

FOREIGN PATENT DOCUMENTS

| | | |
|---|---|---|
| DE | 198 48 169 A1 | 5/1999 |
| DE | 103 15 220 A1 | 10/2004 |

(Continued)

*Primary Examiner* — David Angwin
*Assistant Examiner* — Biniam Asmelash
(74) *Attorney, Agent, or Firm* — Bose McKinney & Evans LLP

(57) ABSTRACT

Disclosed is a heater comprising a PTC heating resistor based on barium titanate. The PTC heating resistor is printed onto a substrate. Also disclosed is a method for manufacturing such a heater.

10 Claims, 1 Drawing Sheet

(56) References Cited

U.S. PATENT DOCUMENTS

| | | | |
|---|---|---|---|
| 7,977,610 B2* | 7/2011 | Hamburger | H05B 3/06 |
| | | | 219/504 |
| 8,084,721 B2* | 12/2011 | Mori | H05B 3/50 |
| | | | 219/202 |
| 8,835,818 B2* | 9/2014 | Anthony | H05B 3/34 |
| | | | 219/542 |
| 9,435,562 B2* | 9/2016 | Giffels | F24H 1/103 |
| 2007/0045274 A1* | 3/2007 | Lee | F24H 3/0405 |
| | | | 219/222 |
| 2009/0107985 A1* | 4/2009 | Mori | H05B 3/50 |
| | | | 219/534 |
| 2009/0139983 A1 | 6/2009 | Luppold et al. | |
| 2009/0283511 A1 | 11/2009 | Wang | |
| 2011/0049130 A1* | 3/2011 | Anthony | H05B 3/34 |
| | | | 219/544 |
| 2011/0233181 A1* | 9/2011 | Reiss | B60H 1/2218 |
| | | | 219/202 |
| 2012/0205362 A1* | 8/2012 | Etzkorn | H05B 1/0236 |
| | | | 219/201 |
| 2013/0163971 A1* | 6/2013 | Luppold | H05B 3/24 |
| | | | 392/487 |
| 2014/0050466 A1* | 2/2014 | Giffels | F24H 1/103 |
| | | | 392/488 |
| 2014/0097179 A1 | 4/2014 | Conway et al. | |
| 2014/0326709 A1* | 11/2014 | Chabach | H05B 3/34 |
| | | | 219/217 |

FOREIGN PATENT DOCUMENTS

| | | |
|---|---|---|
| DE | 10 2006 018 784 A1 | 6/2007 |
| DE | 10 2012 109 801 A1 | 4/2014 |
| JP | 05082304 A * | 4/1993 |

\* cited by examiner

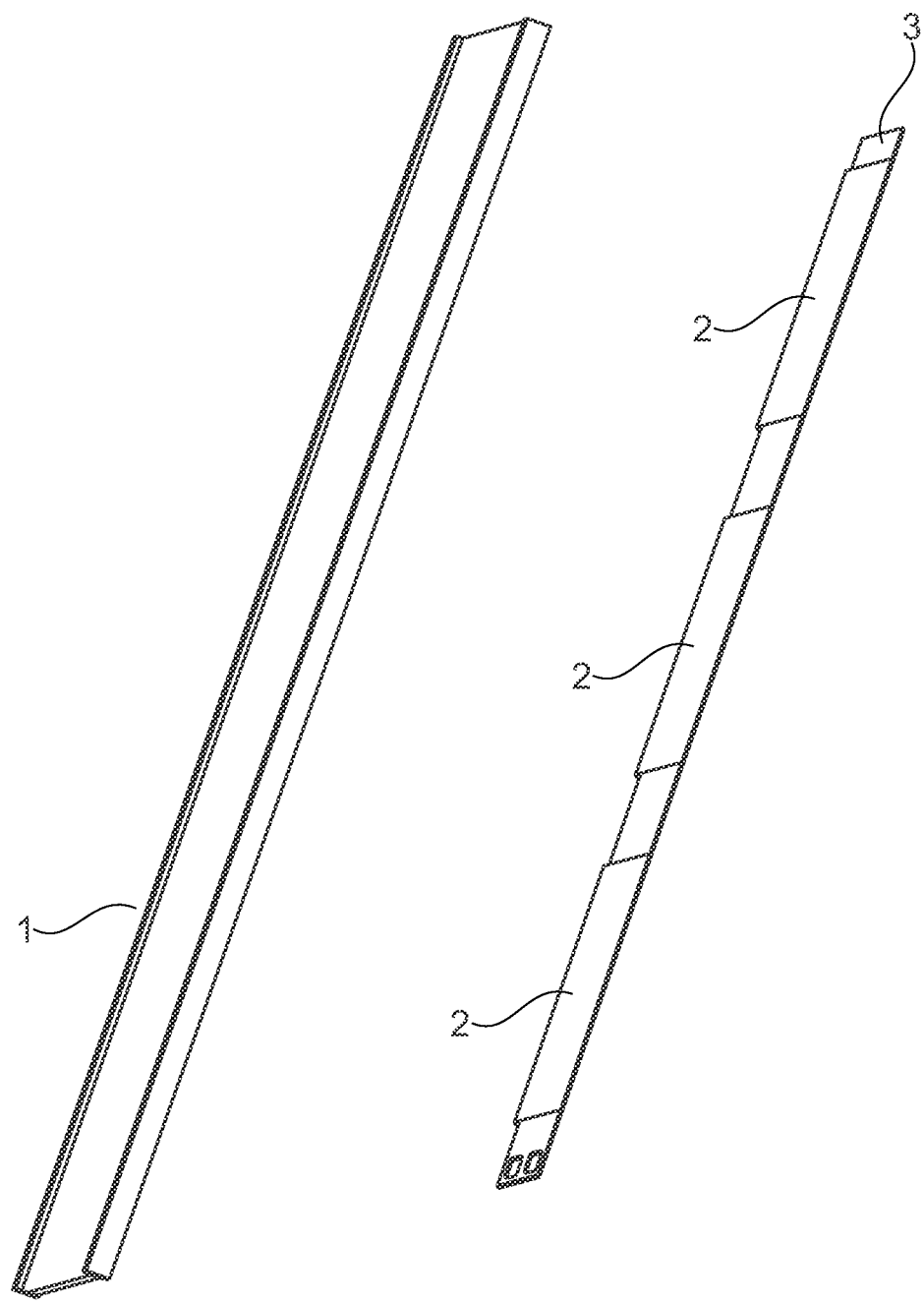

HEATER AND METHOD FOR MANUFACTURING A HEATER

RELATED APPLICATIONS

This application claims priority to DE 10 2014 106 157.8, filed May 2, 2014, and also claims priority to DE 10 2014 110 164.2, filed Jul. 18, 2014, both of which are hereby incorporated herein by reference in their entireties.

BACKGROUND

The invention relates to a heater rod of the type generally within the features listed in the preamble of claim 1. Such a heater rod is known from DE 198 48 169 A1.

Heater rods of this kind are used for heating the interior of cars. The heater rods are attached to heat sinks for transferring heat to an air flow, as disclosed in DE 10 2006 018 784 A1 and DE 10 2012 109 801 A1.

SUMMARY

The present invention demonstrates how heaters for automotive applications can be produced more cost efficiently.

Whereas prior art heater rods comprise individual PTC pellets that are positioned on a strip of sheet metal by a polymeric frame, this disclosure uses a PTC heating resistor which is printed onto a substrate. This greatly facilitates the manufacturing process. Handling of individual PTC pellets is no longer necessary, nor is a frame needed for positioning PTC pellets. The printed PTC resistor is based on barium titanate.

The substrate may be a sheet metal strip, e.g., an aluminum strip. The metal strip can be insulated from a surrounding metal tube by means of an insulating layer, for example a separate strip of electrically insulating ceramic, e.g., alumina. Another possibility is to use a polymer film or to anodize the metal strip on one side and to print the PTC heating resistor onto the opposite side.

The substrate may also be an electrically insulating ceramic strip. One or more contact pads connected to the PTC resistor can be printed onto the ceramic strip. Preferably an electrically conducting layer is arranged between the PTC heating resistor and the ceramic strip. The electrically conducting layer is preferably a metallic layer. The conducting layer can be printed onto the ceramic strip or deposited by chemical or physical deposition methods, e.g., by vapor deposition. The PTC resistor can then be printed onto the conducting layer.

It is possible to print several PTC heating resistor layers on top of each other. Thereby PTC heating resistors of almost any thickness and resistance can be produced. PTC heating resistor layers can be printed as a paste or ink. After such a printing step the substrate can be fired causing the newly printed layer to dry and to sinter. After such a firing step another PTC heating resistor layer can be printed on top of the present PTC heating resistor layer. There is no limit to the number of PTC heating resistor layers that can be printed on top of each other.

An advantageous refinement of this disclosure is to print the PTC heating resistor by screen printing.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 1 shows an exploded view of a heater rod.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

The heater rod comprises a flat tube 1 made of metal, e.g., aluminum, and one or several PTC heating resistors 2 arranged inside the tube 1. The heating resistor 2 is provided as one or several layers that is/are screen printed onto a substrate 3.

The substrate 3 can be a strip of sheet metal, e.g., aluminum. The PTC heating resistor 2 can be screen printed onto a front side of a sheet metal strip. The sheet metal strip can be electrically insulated from the metallic tube 1 by an electrically insulating layer, e.g., a strip of electrically insulating ceramic like alumina or a polymer film. Instead of a separate insulating layer, like an additional strip or film, the insulating layer may also be part of the metal strip, e.g., an anodized surface.

Another possibility is to use a ceramic strip as a substrate. For example the PTC heating resistor 2 can be screen printed onto a strip of electrically insulating ceramic like alumina. If the substrate is a strip of electrically insulating ceramic, the substrate may be prepared by depositing an electrically conducting layer, e.g., a metallic layer, onto the strip of electrically insulating ceramic. The PTC heating resistor is then printed onto the electrically conducting layer. The electrically conducting layer may be deposited by printing conductor paste onto one side of the ceramic strip. Another possibility is to use chemical or physical deposition methods, e.g., vapor deposition, for depositing a metallic layer onto one side of the ceramic strip.

After the substrate 3 and the at least one PTC heating resistor 2 are placed inside the flat tube 1, tube 1 is compressed. Thereby the tube 1 is made even flatter by plastic deformation. Thermal contact between the PTC heating resistor 2 and the metal tube 1 is improved by compression. The flat tube 1 is a profile tube which can be produced by extrusion. The flat tube 1 preferably has generally rectangular interior.

The PTC heating resistor 2 is based on barium titanate. Some of the barium and or titanium atoms of the PTC heating resistor 2 may be substituted by calcium, strontium and/or lead for example. For example, the metal atoms of the sintered PTC heating resistor 2 may comprise 30 to 40% Ba, 50 to 60% Ti, up to 10% Pb, and 0.5 to 5% other metal atoms. These percentages are atomic percentages of metal atoms present in the PTC heating resistor, i.e. neglecting the oxygen atoms. The screen printing is done with a paste or ink. After the printing process the substrate is fired. Additional PTC heating layers can be printed on top of each other. Thereby the heating rod can be produced with a desired heating power and/or precisely defined resistance levels.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A heater rod comprising:
   a substrate;
   a positive temperature coefficient heating resistor based on barium titanate, wherein the positive temperature coefficient heating resistor is a self-adhering printed layer on the substrate; and
   wherein the positive temperature coefficient heating resistor is printed as a paste or ink and the securement of the positive temperature coefficient heating resistor to the substrate consists essentially of self-adherence of the printed layer directly to the substrate.

2. Heater rod according to claim 1, wherein the positive temperature coefficient heating resistor is printed onto an electrically conductive surface of the substrate.

3. Heater rod according to claim 1, wherein the positive temperature coefficient heating resistor is printed onto a metallic surface of the substrate.

4. Heater rod according to claim 1, wherein the positive temperature coefficient heating resistor is arranged in a tube.

5. Heater rod according to claim 1, wherein the substrate includes an electrically insulating ceramic strip.

6. Heater rod according to claim 5, wherein an electrically conducting layer is arranged between the positive temperature coefficient heating resistor and the electrically insulating ceramic strip.

7. Heater rod according to claim 1, wherein the substrate is a sheet metal strip.

8. Heater rod according to claim 1, wherein the heater rod comprises a plurality of positive temperature coefficient heating resistor layers printed as a paste or ink with the plurality of layers being printed on top of each other wherein the substrate defines a major planar surface and the plurality of positive temperature coefficient heating resistor layers form a multi-layered structure wherein each of the layers of the multi-layered structure is oriented parallel with the major planar surface of the substrate.

9. A heater rod comprising:
   a substrate including an electrically insulating ceramic strip and an electrically conducting layer;
   a positive temperature coefficient heating resistor based on barium titanate, wherein the positive temperature coefficient heating resistor is a self-adhering printed layer on the substrate; and
   wherein the electrically conducting layer is arranged between the positive temperature coefficient heating resistor and the electrically insulating ceramic strip and the positive temperature coefficient heating resistor is printed as a paste or ink and the securement of the positive temperature coefficient heating resistor to the substrate consists essentially of self-adherence of the printed layer directly to the substrate whereby the positive temperature coefficient heating resistor is directly self-adhered to the electrically conducting layer of the substrate.

10. Heater rod according to claim 9, wherein the heater rod comprises a plurality of positive temperature coefficient heating resistor layers printed as a paste or ink with the plurality of layers being printed on top of each other wherein the substrate defines a major planar surface and the plurality of positive temperature coefficient heating resistor layers form a multi-layered structure wherein each of the layers of the multi-layered structure is oriented parallel with the major planar surface of the substrate.

* * * * *